US012584518B2

(12) United States Patent
Calvo Isasi et al.

(10) Patent No.: US 12,584,518 B2
(45) Date of Patent: Mar. 24, 2026

(54) PRE-ASSEMBLED UNIT HAVING TWO TAPERED ROLLER BEARINGS

(71) Applicant: FERSA BEARINGS S.A., Saragossa (ES)

(72) Inventors: José Enrique Calvo Isasi, Saragossa (ES); Ignacio Miguel Martín, Saragossa (ES); Javier Salvador Lou, Saragossa (ES); Sergio Santo Domingo, Saragossa (ES)

(73) Assignee: FERSA BEARINGS S.A., Saragossa (ES)

( * ) Notice: Subject to any disclaimer, the term of this patent is extended or adjusted under 35 U.S.C. 154(b) by 141 days.

(21) Appl. No.: 18/578,795

(22) PCT Filed: Jun. 29, 2022

(86) PCT No.: PCT/ES2022/070410
§ 371 (c)(1),
(2) Date: Jan. 12, 2024

(87) PCT Pub. No.: WO2023/002076
PCT Pub. Date: Jan. 26, 2023

(65) Prior Publication Data
US 2024/0318686 A1     Sep. 26, 2024

(30) Foreign Application Priority Data

Jul. 21, 2021   (ES) ................................ ES202130703

(51) Int. Cl.
| *F16C 19/54* | (2006.01) |
| *F16C 19/38* | (2006.01) |
| *F16C 33/46* | (2006.01) |

(52) U.S. Cl.
CPC .......... *F16C 19/543* (2013.01); *F16C 19/386* (2013.01); *F16C 33/4676* (2013.01)

(58) Field of Classification Search
CPC .... F16C 19/385; F16C 19/386; F16C 19/542; F16C 19/543
See application file for complete search history.

(56) References Cited

U.S. PATENT DOCUMENTS

| 2,606,799 A | | 8/1952 | Weckstein | |
| 2,615,767 A | * | 10/1952 | Gunn | .................... F16C 19/385 |
| | | | | 384/571 |

(Continued)

FOREIGN PATENT DOCUMENTS

| CN | 106545580 A | 3/2017 |
| ES | 1072603 U | 8/2010 |

(Continued)

OTHER PUBLICATIONS

Translation of JP2008075837 obtained Jul. 29, 2025.*
International Search Report with translation and Written Opinion for PCT Application No. PCT/ES2022/070410, mailed Oct. 4, 2022.

*Primary Examiner* — James Pilkington
(74) *Attorney, Agent, or Firm* — Notaro, Michalos & Zaccaria P.C.

(57)     ABSTRACT

A pre-assembled unit having two tapered roller bearings for a driven shaft designed to be replaced efficiently and to maintain optimal tightness as if it were factory assembled. The bearing has a rubber seal attached to a lateral face of the inner race of one of the tapered rollers, the face being opposite the smooth face of the other tapered roller. The necessary widening of the inner races requires a a roller cage that allows the rollers to rock slightly in order to be assembled without causing damage or becoming damaged.

4 Claims, 5 Drawing Sheets

(56)     References Cited

U.S. PATENT DOCUMENTS

| 5,074,680 | A | * | 12/1991 | Hoch | ...................... F16C 23/10 |
| | | | | | 384/560 |
| 5,492,419 | A | | 2/1996 | Miller et al. | |
| 11,293,484 | B2 | * | 4/2022 | Ishikawa | ............... F16C 19/225 |
| 2013/0017089 | A1 | * | 1/2013 | Stiesdal | ................... F16C 33/60 |
| | | | | | 384/570 |
| 2016/0084311 | A1 | * | 3/2016 | Dittmar | ................... F16C 19/22 |
| | | | | | 384/572 |
| 2020/0217360 | A1 | | 7/2020 | Edelmann et al. | |

FOREIGN PATENT DOCUMENTS

| JP | 2008075837 | A | * | 4/2008 | ............ F16C 19/386 |
| JP | 2014202284 | A | | 10/2014 | |
| WO | 2015092099 | A1 | | 6/2015 | |

* cited by examiner

1

PRE-ASSEMBLED UNIT HAVING TWO TAPERED ROLLER BEARINGS

CROSS-REFERENCE TO RELATED APPLICATIONS

This application is a national phase entry under 35 U.S.C. § 371 of International Application No. PCT/ES2022/070410, filed on Jun. 29, 2022, which claims the benefit of Spanish Patent Application No. P202130703, filed on Jul. 21, 2021. The contents of these applications are hereby incorporated by reference herein in their entireties.

Field

As its title indicates, this specification relates to a paired bearing of the pre-assembled unit type with two tapered roller bearings, which combines a simpler and more intuitive assembly that guarantees tightness with a more standardised design that resolves the problems of positioning on the driven shaft. As well as a roller cage under the bearing race, which allows the bearings to rock for a friction-free and damage-free mounting of the bearing itself.

BACKGROUND OF THE INVENTION

One of the most common problems of this type of pre-assembled unit having two tapered roller bearings whose application is driven shafts is that they must be replaced due to wear. The assembly is often performed without the appropriate means, the necessary tools or sufficient knowledge.

In the prior art there is the use of sealing gaskets to seal the joint between the inner rings of a pre-assembled unit having two tapered roller bearings, we cite some of them below.

Document ES 1072603 discloses the use of a sealing gasket of asymmetrical cross-section positioned in housing recesses made on the outer face of the inner races.

CN106545580 discloses a seal between the small end surfaces of a bearing, consisting of a spring-locking race and an inner race with an O-shaped section These solutions solve the tightness problem a priori, but do not take into account that an incorrect assembly causes oil to enter through the bearing. The problems that can be caused by an inadequate assembly are diverse in nature, we mention some of them below:

It is not assembled in the correct order and the seal may fall out.

The lack of visibility does not help to verify the correct position of the seal.

The seal can remain in the bag.

Pinching of the axial seal during assembly.

The invention described below focuses on the problems described above and presents a pre-assembled unit having two tapered roller bearings with a highly inventive solution that resolves the tightness problems and also has a new cage that allows the rollers to rock for their mounting which reduces the risk of scratches or damage that compromises the durability of this type of pre-assembled unit having two tapered roller bearings.

DESCRIPTION OF THE INVENTION

Below, we describe a pre-assembled unit having two tapered roller bearings for driven shaft that has two important novelties with respect to those currently available on the market. On the one hand, it resolves the important problem of this type of bearing, which is tightness, and on the other hand, a cage for the rollers that allows them to rock during the assembly of the bearing itself.

The solution to the tightness problem is the use of a rubber seal fitted on the free front lateral face of one of the cones as explained below.

A pre-assembled unit having two tapered roller bearings is a double, paired bearing, i.e. it is basically a symmetrical construction of two cones, two cages with outer roller bearings seated in tapered cone walls and one or two seal races. The cones are designed with races opposite each other in the centre of the bearing. These races, in addition to having fastening means on the inner face, collide on their two outer smooth lateral faces to cause a closing of both cones. To guarantee an excellent sealing of this seal, in this invention it is proposed to use a rubber seal selected from a commercially available O-ring or a gasket especially designed to seal the joint with a regular or irregular polygonal geometric section and fixed to one of the inner faces of one of the cones.

In order to accommodate a rubber seal on the free lateral face of one of the inner races, a widening of the inner races is required. This progressive widening makes it possible to construct in the free front lateral face of one of the cones of the pre-assembled unit assembly having two tapered roller bearings, a recess, limited by an outer ring and an inner ring that collide with the smooth front face of the inner race of the other cone of the pre-assembled unit.

The rubber seal protrudes slightly out of the recess, collides with and deforms against the smooth outer wall of the opposite inner race providing the tightness required in this type of driven shaft bearing. Furthermore, as the rubber seal can be fixed by adhesive, it simplifies mounting and prevents it from being misplaced or incorrectly positioned and not providing the tightness required for the service life of this type of bearing.

This technical solution, as mentioned above, leads to an increase in the diameter of the inner races, which means that the roller assembly must be modified. This leads to the second aspect of the invention presented by this pre-assembled unit of two tapered roller bearings, is a new cage for mounting the rollers that allows the rollers to rock when passing through the widened inner race, thus overcoming their passage through the inner race and allowing proper seating on the tapered wall of the inner cone without causing damage to the surface of the rollers that could compromise the service life of the bearing.

The cage of this type of bearing consists of two rings, one of which has a larger diameter than the other, joined by arms that are distributed equidistantly around both rings. The cage arm has a trapezoidal section with a slight progressive widening towards the base, considering the base to be the part closest to the ring with the largest diameter. This arm, externally, has a pronounced widening at its base that rises a necessary variable length that allows the bearing to rock and provides a safe and reliable assembly, the other narrow part of the arm rises to join the race of smaller diameter, maintaining its trapezoidal section and a slight tapering. On the inside of the arm, there is a notch or cut on both inner sides that allows the slight rocking of the rollers, which, combined with the widening, prevents them from falling during assembly.

The cage is made of a high mechanical and thermal performance polymer.

All information referring to examples or modes of embodiment, form part of the description of the invention.

DESCRIPTION OF THE FIGURES

In order to better understand the object of the present invention, a preferential practical embodiment thereof has been represented in the attached drawing.

PREFERRED EMBODIMENT OF THE INVENTION

Figure 1:
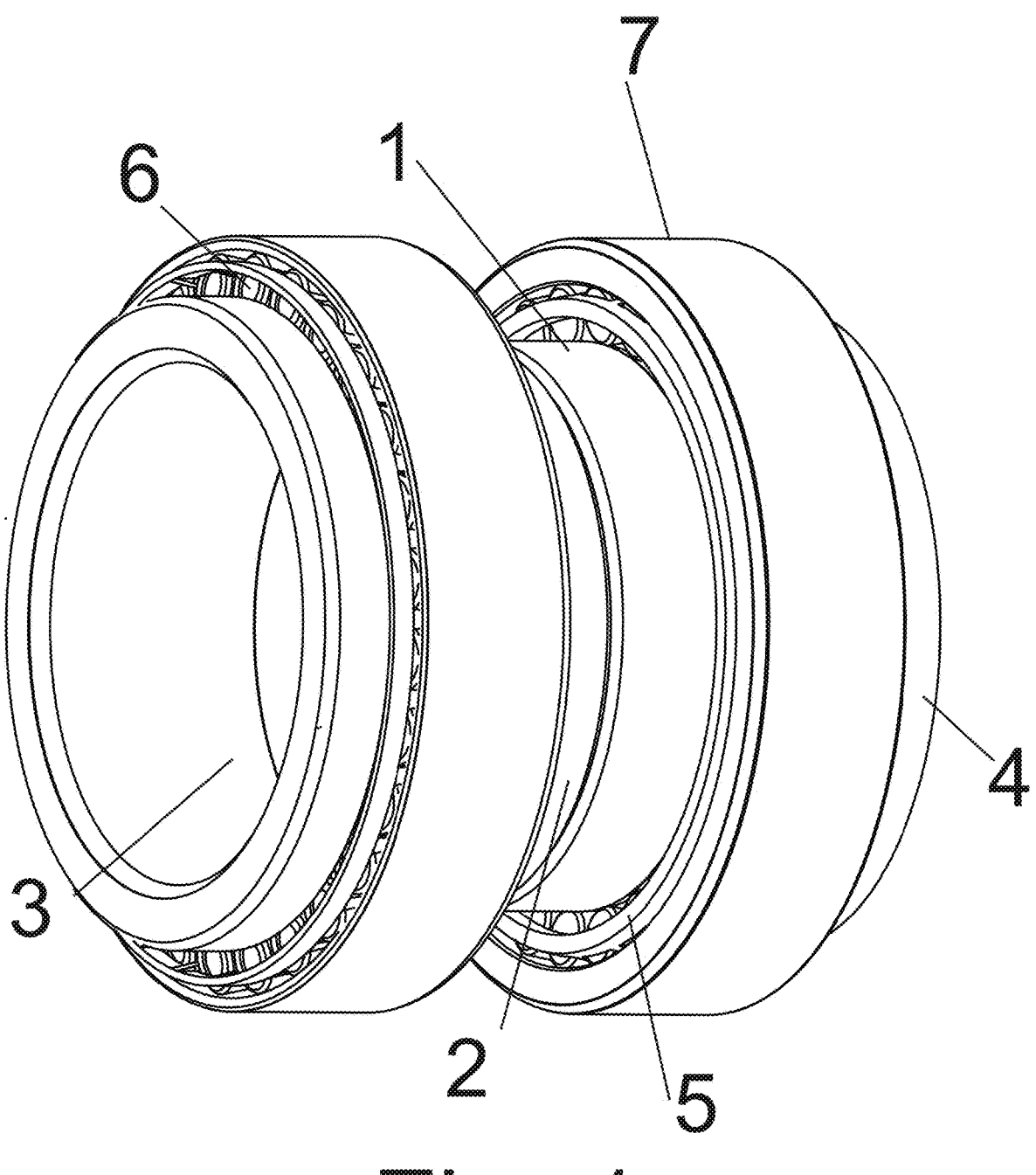
FIG. 1—Shows the pre-assembled unit having two tapered roller bearings.

The device, pre-assembled unit having two tapered roller bearings, object of the present invention shows, in FIG. 1, said bearing mounted. As can be observed in the drawing, there are two paired roller bearings (6). The inner race (1) conceals in the free outer face, a recess (10) that houses a rubber seal (8) selected between an O-ring of commercial use or a regular or irregular polygonal section especially designed to seal the joint, which presses on the smooth outer face of the smooth inner race (2), providing the necessary tightness for the proper useful life of this type of bearings whose application are driven shafts. Also shown in this figure, under the outer race (7) of the bearings, is the position of the cage (5) with the rollers (6) mounted on the sealing cone (4) and on the plain cone (3).

Figure 2:
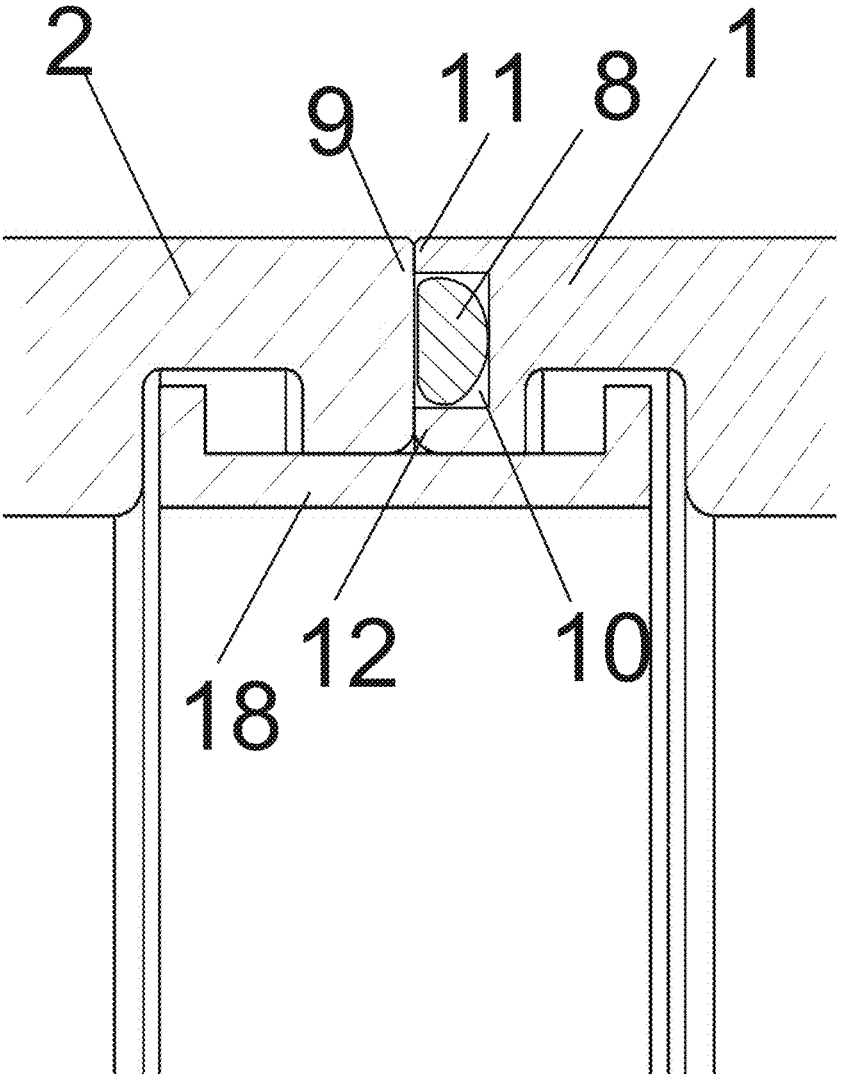
FIG. 2—Shows a section of the inner races, the housing recess (10) and the rubber seal (8).

FIG. 2 shows a detail of the main object of the invention, the special design of the free lateral face of the inner race (1) side face, with a recess (10) for inserting a rubber seal (8). This recess is limited by an outer race (11) and an inner race (12) which collide with the smooth outer face (9) of the smooth inner race (2) of the smooth cone (3). Both bearings are fixed by a sealing washer (18). The pressure exerted by the preload whereby the pre-assembled unit having two tapered roller bearings is mounted in the application deforms the rubber, creating a seal that prevents the entry of con-taminating fluids, thus improving the useful life of the bearing.

Figure 3:
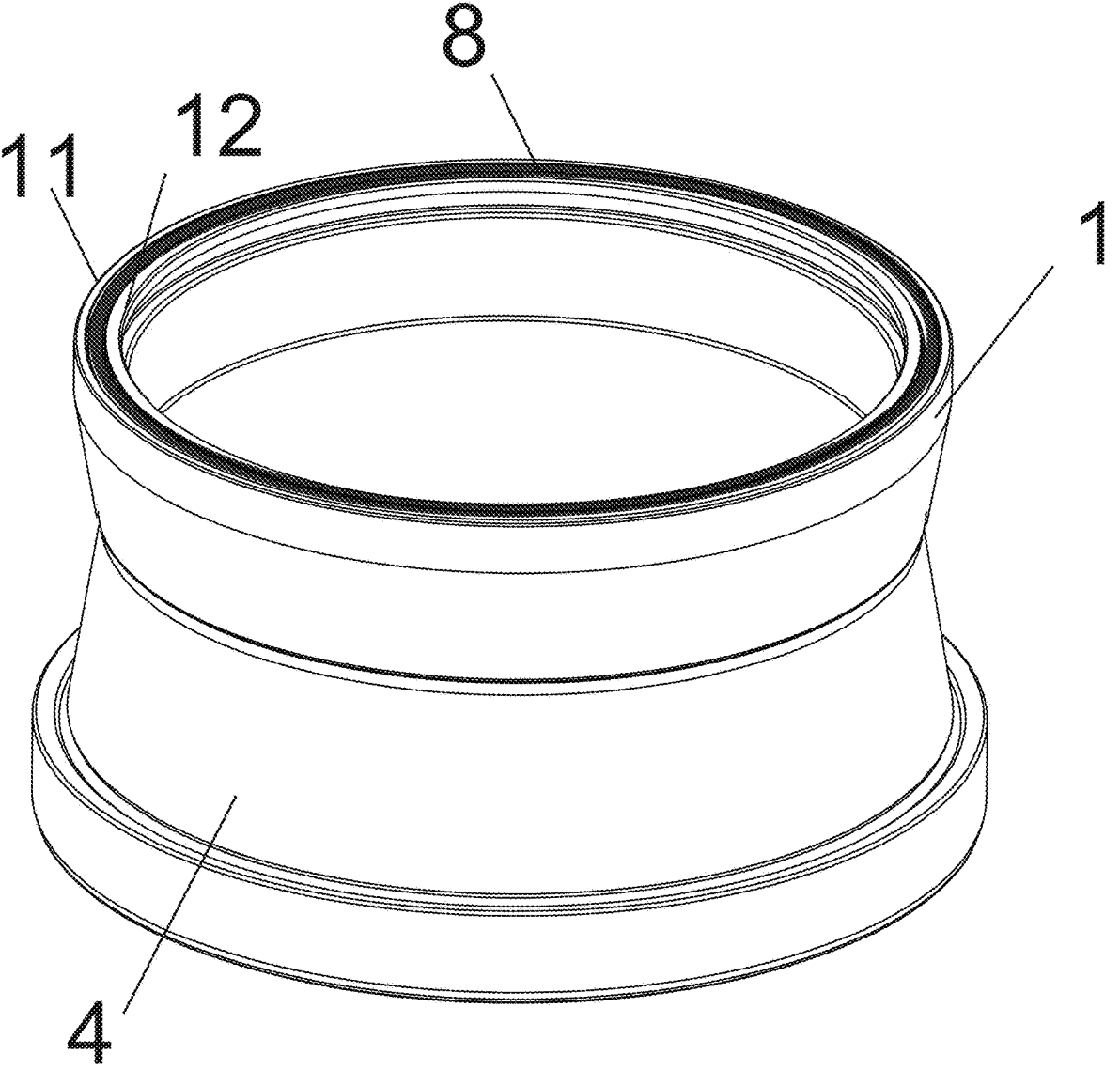
FIG. 3—Shows the cone of the seal (4) prior to assembly where the outer face with the rubber seal (8) and its inner race (1) can be seen.

FIG. 3 shows the sealing cone (4) where it can be seen that in order to place the rubber seal (8) in the recess (10) on the outer face of the inner race (1) a widening of the latter is required. This necessary widening makes a new cage design (5) necessary which allows the rollers (6) to rock so that they can be mounted without being damaged or damaging the sealing cone (4) or the smooth cone (3) due to friction.

Figure 4:
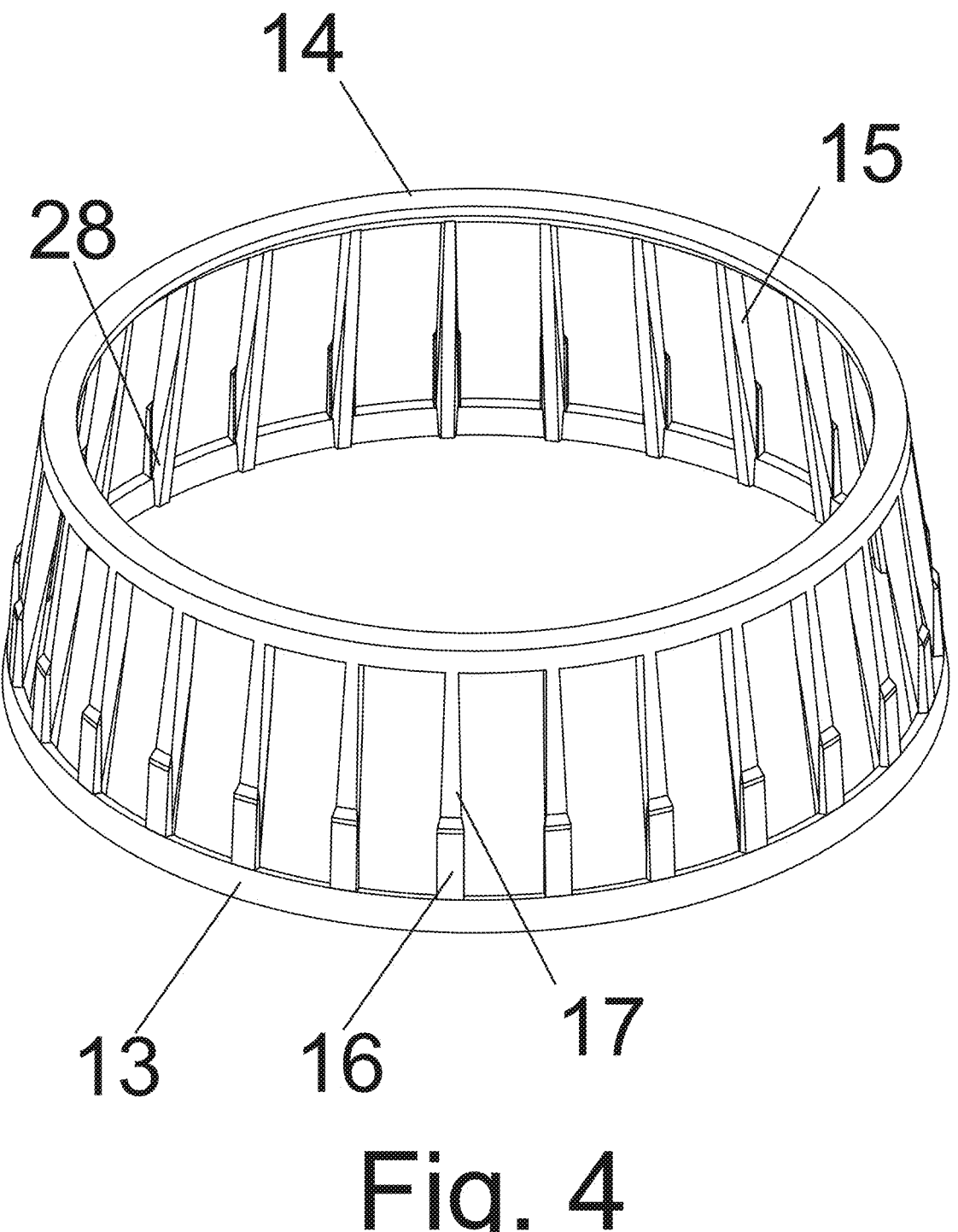
FIG. 4—Shows the cage (5) where its construction and the most relevant details of the arms (15) can be seen.

FIG. 4 shows the cage (5). This cage is designed on the basis of two rings (13, 14), a ring of larger diameter (13) and another ring of smaller diameter (14) joined by arms (15) that are distributed equidistantly along the entire contour of the rings. This cage (5) as a whole has a conical volume, in each of the recesses we place a conical roller (6) and the cage (5) rollers (6) assembly is mounted on the cones (3, 4). In order not to damage the cones (3, 4) or the rollers (6) due to the widening of the inner races (1, 2), we must allow a rocking movement of the rollers (6) without the risk of falling or losing any roller (6) in the assembly. For this purpose, a special design of the arms (15) of the cage (5) has been created. The arm (15) of the cage has a trapezoidal section with a slight progressive widening towards the base, considering the base to be the part closest to the ring of larger diameter (13). This arm (15), seen from the outside, has a pronounced widening at its base (16) that rises along the arm perpendicular to the ground the necessary length to allow the roller to rock and provide a safe and reliable mounting, the other narrow part of the arm (17) rises to join the race of smaller diameter (14), maintaining its trapezoidal section and the slight narrowing. On the inside of the arm, there is a notch or cut (28) on both inner faces, which allows the rollers (6) to rock slightly without allowing them to fall.

Figure 5:
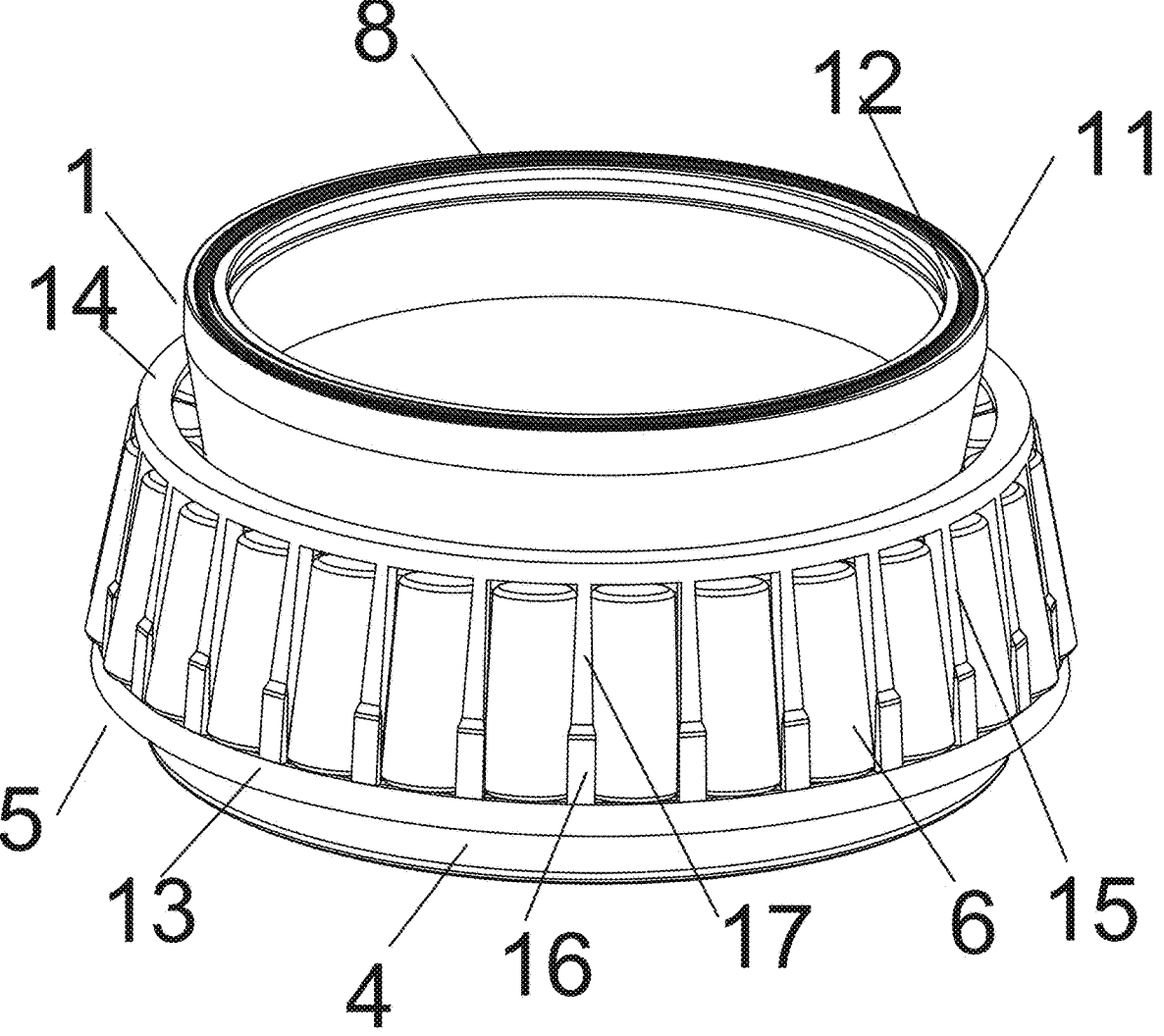
FIG. 5—Shows the inner race (1) with the cage (5) and rollers (6) mounted, but without the outer race (7).

FIG. 5 shows one of the bearings of the assembly shown in FIG. 1, specifically the cone (4) where the rubber seal (8) is mounted and how the cage (5) is seated with the rollers (6) in the absence of mounting the outer race (7). The rollers (6) are perfectly seated on the conical surface of the cone (3, 4) and the need for the rocking to allow the assembly can be observed and that the purpose of such rocking is to avoid damage to rollers (6), cone (3, 4) and/or outer race (1, 2).

Persons skilled in the art will easily understand that the characteristics of different embodiments can be combined with characteristics of other possible embodiments when-ever such a combination is technically possible.

The invention claimed is:

1. A pre-assembled unit having two tapered roller bear-ings comprising:
    an inner race of a sealing cone which has, on a free outer side face of the inner race of the sealing cone, a recess limited by an outer ring and an inner ring,
    an inner race of a second cone that is separate from the sealing cone, the inner race of the second cone having a flat free outer side face,
    a rubber seal inserted in the recess, and
    two cages that mount rollers, each of said cages compris-ing a first cage ring and a second cage ring, wherein a diameter of the first cage ring is greater than a diameter of the second cage ring,
    wherein each of said cages comprises a series of arms disposed equidistantly around and joining the first cage ring and the second cage ring, wherein each of the series of arms has a trapezoidal section that widens from a first end thereof to a second end thereof, the first end thereof being a portion closest to the second cage ring, the second end thereof being a portion closest to the first cage ring, wherein each of the series of arms includes a widened base portion adjacent to the first cage ring that extends along that arm from the second end thereof, and is configured to permit rocking of associated rollers while retaining the rollers between adjacent arms, and wherein a notch or cut is formed on an inner surface of each inner face of each of the series of arms to permit rocking of the associated rollers while preventing the associated rollers from falling out during assembly.

2. The pre-assembled unit having two tapered roller bearings according to claim 1, wherein a free lateral face of the outer race and the free outer side face of the inner race which delimit the recess for the rubber seal are opposite each other.

3. The pre-assembled unit of two tapered roller bearings according to claim 1, wherein the rubber seal is fixed to the recess by means of adhesive and/or pressure.

4. The pre-assembled unit of two tapered roller bearings according to claim 1, wherein the cross-section of the rubber seal is chosen from among the following configurations:
  circular,
  regular polygonal, and
  irregular polygonal.

\* \* \* \* \*